(12) United States Patent
Raetz et al.

(10) Patent No.: US 7,416,581 B2
(45) Date of Patent: Aug. 26, 2008

(54) AIR-PERMEABLE FILTRATION MEDIA, METHODS OF MANUFACTURE AND METHODS OF USE

(75) Inventors: James A. Raetz, Waseca, MN (US); Gregory J. Raetz, Crystal, MN (US)

(73) Assignee: Point Source Solutions, Inc., Waseca, MN (US)

( * ) Notice: Subject to any disclaimer, the term of this patent is extended or adjusted under 35 U.S.C. 154(b) by 373 days.

(21) Appl. No.: 11/219,533

(22) Filed: Sep. 1, 2005

(65) Prior Publication Data
US 2006/0054023 A1    Mar. 16, 2006

Related U.S. Application Data

(60) Provisional application No. 60/607,118, filed on Sep. 3, 2004.

(51) Int. Cl.
*B01D 53/02* (2006.01)
*B01D 53/32* (2006.01)

(52) U.S. Cl. .................. 95/90; 95/148; 55/524
(58) Field of Classification Search .................. 96/108, 96/134, 154; 95/90, 148; 55/524; 428/323–331
See application file for complete search history.

(56) References Cited

U.S. PATENT DOCUMENTS

| | | | |
|---|---|---|---|
| 1,675,228 A | 6/1928 | Schmidt | |
| 2,001,828 A | 5/1935 | Smith | |
| 2,117,570 A | 5/1938 | Philipp | |
| 2,206,705 A | 7/1940 | Newman | |
| 2,222,882 A | 11/1940 | Shames | |
| 2,581,684 A | 1/1952 | McKenzie | |
| 2,693,864 A | 11/1954 | Ferro | |
| 2,765,046 A | 10/1956 | Rondholz | |
| 3,266,973 A | 8/1966 | Crowley | |
| 3,309,849 A | 3/1967 | Ward | |
| 3,739,558 A | 6/1973 | Hurson | |
| 3,971,373 A * | 7/1976 | Braun | .................. 128/206.19 |
| 4,065,262 A | 12/1977 | Petroff | |
| 4,118,226 A | 10/1978 | Bourassa | |
| 4,166,037 A | 8/1979 | Montagnon | |
| 4,433,024 A | 2/1984 | Eian | |
| 4,510,193 A | 4/1985 | Blücher et al. | |
| 4,525,410 A | 6/1985 | Hagiwara et al. | |
| 4,565,727 A * | 1/1986 | Giglia et al. | ................. 428/172 |
| 4,610,705 A | 9/1986 | Sarnosky et al. | |
| 4,689,058 A | 8/1987 | Vogt et al. | |
| 4,793,837 A | 12/1988 | Pontius | |
| 4,863,499 A | 9/1989 | Osendorf | |
| 4,948,567 A | 8/1990 | Atarashiya | |

(Continued)

OTHER PUBLICATIONS

"Promotional Material—USA Filters—Ultra Strained Atmosphere", (before Sep. 1, 2005), 2 pgs.

*Primary Examiner*—Frank M Lawrence
(74) *Attorney, Agent, or Firm*—Schwegman, Lundberg & Woessner P.A.

(57) ABSTRACT

The present invention provides an air-permeable filtration media that includes an air-permeable backing and an adsorbent. The adsorbent is at least partially embedded in the air-permeable backing. The present invention also provides a method of manufacturing an air-permeable filtration media. The present invention also provides a method of substantially removing contaminants form air, employing the air-permeable filtration media.

20 Claims, 6 Drawing Sheets

U.S. PATENT DOCUMENTS

| | | |
|---|---|---|
| 4,963,431 A | 10/1990 | Goldstein et al. |
| 4,981,501 A | 1/1991 | Von Blücher et al. |
| 4,992,084 A | 2/1991 | Von Blücher et al. |
| 4,995,556 A | 2/1991 | Arnold, III |
| 5,062,272 A | 11/1991 | Burns |
| 5,129,929 A | 7/1992 | Linnersten |
| 5,141,706 A | 8/1992 | Clark |
| 5,192,346 A | 3/1993 | Kowalczyk |
| 5,221,573 A | 6/1993 | Baigas, Jr. |
| 5,226,937 A | 7/1993 | Linnersten et al. |
| 5,244,695 A | 9/1993 | Davidowich et al. |
| 5,281,437 A | 1/1994 | Singh |
| 5,288,298 A | 2/1994 | Aston |
| 5,296,254 A | 3/1994 | Tsuru |
| 5,350,443 A | 9/1994 | von Blücher et al. |
| 5,374,453 A | 12/1994 | Swei et al. |
| 5,417,743 A | 5/1995 | Dauber |
| 5,422,078 A | 6/1995 | Colon |
| 5,468,447 A | 11/1995 | Bermas |
| 5,492,675 A | 2/1996 | Brizard |
| 5,500,247 A | 3/1996 | Hagvist |
| 5,516,552 A | 5/1996 | Bontrager et al. |
| 5,569,489 A | 10/1996 | Kasmark, Jr. |
| 5,582,865 A * | 12/1996 | Rezuke et al. ............... 427/244 |
| 5,593,481 A | 1/1997 | Redner |
| 5,593,482 A | 1/1997 | Dauber et al. |
| 5,616,169 A | 4/1997 | de Ruiter et al. |
| 5,662,728 A | 9/1997 | Groeger |
| 5,747,110 A | 5/1998 | Tallentire et al. |
| 5,972,427 A | 10/1999 | Mühlfeld et al. |
| 6,346,143 B1 | 2/2002 | McGowan |
| 6,703,072 B2 * | 3/2004 | Fu et al. .................... 427/201 |
| D506,816 S | 6/2005 | Garman et al. |
| 6,908,502 B2 | 6/2005 | Wireman |
| 6,997,975 B2 | 2/2006 | Stefanoni |

* cited by examiner

AIR-PERMEABLE FILTRATION MEDIA, METHODS OF MANUFACTURE AND METHODS OF USE

RELATED APPLICATION

This application claims priority under 35 USC 119(e) to U.S. Provisional Application No. 60/607,118, filed Sep. 3, 2004, which is incorporated herein by reference.

BACKGROUND OF THE INVENTION

Ironically, modern technology had much to do with the creation of indoor air quality concerns. Outdoor air infiltration and high rates of outside make-up air were acceptable when energy was relatively cheap. Energy became more expensive in the early 1970's and architects and engineers responded with designs for tightly sealed, energy-efficient buildings. Indoor air is now recirculated and kept indoors much longer than before. Furthermore, the average American is now spending greater than 90 percent of their time in indoor environments.

There are indoor environments that appear to be causing health and comfort related problems to building occupants and the causes are not identifiable. Pollutant compounds that may be responsible are either not being identified or are not being considered. Common symptoms associated with Sick Building Syndrome (SBS) can include stinging, itchy eyes; throat and nasal membrane irritation; and the perception of odors. Such sensory irritations may lead to headaches, fatigue, general lethargy and worse.

Decades-long research on the adverse effects of outdoor air pollutants has demonstrated that increased concentrations of small particles are directly related to increased mortality. Furthermore, recent studies by researchers at the Harvard School of Public Health suggest that indoor particles may be more bioactive (i.e., potentially unhealthy) than outdoor particles. Therefore, there is no question as to the necessity of employing a good particulate filter in the effort to improve indoor air quality.

It must be understood that the indoor environment is very different than the outdoor environment when it comes to air pollution. Because of the enclosed environment and recirculated conditions, pollutants are trapped together for an extended period of time and chemical reactions can take place between pollutants that are normally rapidly dispersed in outdoor environments. This phenomenon can work to intensify the concentration of irritable and sometimes toxic pollutants. This is of great concern with the use of some types of air freshening and "purifying" devices that can actually aid in chemical transformations, such as ionic devices and devices that promote rapid oxidation of chemicals.

New studies undertaken in an attempt to identify pollutants that pose health risks have lead to the conclusion that there is no simple answer. Many of the various pollutant compounds are found in very low concentrations that are difficult to analyze with today's analytical and instrumentation technologies. Furthermore, the adverse health effects from exposure to these compounds, especially multiple compounds at the same time, are difficult to explain. What this means is that finding and eliminating the source of an irritant or toxic compound is not always feasible.

One of the best monitors available for identifying and gauging the reactivity of indoor air pollutants is the human nose. We perceive the world by way of five inputs: seeing, hearing, touching, tasting and smelling. Smell is unique in that it is the sense that is always open to stimulation. Wherever we are we may close our eyes, plug our ears, touch and taste nothing, but we must breathe, and in drawing in air, we stimulate the base of our brains.

Smelling is a complex operation. New research has discovered nearly 1,000 human genes that are dedicated to the sense of smell. Throughout the history of humans, staying alive often meant being able to interpret smells correctly, whether it was identifying rotten food, or being attracted to a sexually alluring musk. Our noses and brains are programmed to analyze and detect the natural environment. The variety of "olfactants", the molecules we can smell, is near 10,000, some at surprisingly low concentrations, as shown in Table 1 below.

TABLE 1

| Olfactant | Sensitivity Threshold | Concentration |
|---|---|---|
| musk | 0.000, 000, 000, 004 | 4 parts per trillion |
| rancid fat | 0.000, 000, 000, 060 | 60 parts per trillion |
| vanilla | 0.000, 000, 000, 080 | 80 parts per trillion |
| rotten eggs | 0.000, 000, 180 | 180 parts per billion |
| formaldehyde | 0.000, 000, 100 | 100 parts per billion |
| chlorine | 0.000, 004 | 4 parts per million |

In evaluation of current monitoring technologies and studies performed in an attempt to identify problem compounds that contribute to SBS, it is apparent that it may not be possible to come to any specific and useful conclusions. Furthermore, because of the nature of many of the pollutant compound sources, such as building materials, furnishings, cleaning equipment, electrical equipment, building occupants, infiltration of outside air, etc., it may not be feasible to easily eliminate the source of the problem.

As described in many U.S. Environmental Protection Agency reports, indoor air pollution, both in commercial and residential environments are of increasing concern. Of primary concern are very fine particulate matter less than or equal to 2.5 microns in diameter (PM2.5) and volatile organic compounds (VOCs). Such pollutants contribute to indoor air quality concerns that affect building inhabitants in the forms of sick building syndrome, asthma, allergies, malodorous compounds, and general discomfort.

Sources of indoor air contaminates include, but are not limited to, entrainment of ambient outdoor pollutants through circulation of make-up air, poor HVAC design leading to unbalanced conditions that promote growth of mold and bacteria, off-gassing of natural and synthetic building materials, and occupant activities and emanations.

A wide variety of filtration media currently exists and is available for commercial and private use. The variety of existing filtration media includes various adsorbent media. However, the existing manufacturing methods used to produce adsorbent filtration media incorporate some form of binding or adhesive composition to affix various adsorbent compositions to said media. The use of binding or adhesive compositions lowers the efficiency of applied adsorbent compositions and furthermore, the degradation of binding and adhesive compositions through the normal life of the filtration media results in off-gassing and oxidation of some binding and adhesive compositions which can contribute to air borne pollution.

Additionally, through design, currently available adsorbent filtration media is generally targeted at only removing gaseous chemical compounds. For removal of particulate matter, a second filtration media specifically designed for particulate capture is needed.

It is also becoming apparent that there is a need to reduce concentrations of a wide variety of gaseous chemical compounds in the indoor air. It is not practical or possible to remove all sources generating gaseous chemical compound emissions, and even if one could, one would not know which compounds, or group of compounds, may be the source of the problem.

Gaseous chemical compounds, not unlike particulate matter, do have a size. However, that size is generally measured in units of angstroms (1/10,000,000,000 of a meter). In general they are 1,000 to 10,000 times smaller than a fine dust particle and can easily pass through the finest particulate filter. Therefore, there is a need for gas-phase filtration.

Physical adsorption, also referred to as van der Waals adsorption and adsorption condensation, has been widely accepted and proven as a technology for use in the removal of gases and vapors from contaminated air. It is well known that this process works by the weak bonding of gas molecules to a solid adsorbent. The bond energy is similar to the attraction forces between molecules in a liquid.

Some adsorbents used for air pollution control include activated carbon, alumina, bauxite and silica gel. Activated carbon is by far the most frequently used adsorbent, and has virtually displaced all other materials in solvent recovery and purification systems.

Standard activated carbon adsorption systems were initially developed for control volatile organic compounds (VOCs) from industrial process equipment. However, to work effectively, these systems generally contain very large quantities of activated carbon in a thick "carbon bed" system or a "packed tower". The reason for the large container or thick carbon bed is to provide a long enough residence time for contaminated air flowing through the system to allow the VOCs to be captured and to provide enough adsorbent surface area.

When using standard activated carbon, which is generally in a granular form that is greater than 50 microns in diameter, it is difficult to adapt to a system for the light commercial and home environment. Most commercial and home environments do not have the room or cannot support the cost to operate an extensive industrial adsorption system.

Attempts have been made to produce a filtration media that consists of a thick layer of activated carbon that is glued onto, or sandwiched in between various types of media or substrate. The problem with these systems is that due to the large size of granular carbon particles, the thin layer of carbon has many holes that allow a contaminated air stream to pass through without coming into contact with the carbon, especially with low concentration air steams. Use of a thicker layer of carbon becomes prohibitive due to the inability to efficiently hold the carbon to the substrate. Furthermore, when adhesives are used to affix the carbon to a substrate, much of the effective adsorbent surface area of the carbon is reduced due to blinding by the adhesive. Adhesives also result in off-gassing of chemical compounds which can contaminate and shorten the life of the carbon.

By far, the major drawback to the use of larger granular carbon is the very low concentration of target pollutants in the indoor environment. When adsorbing a higher concentration gas with typical granular activated carbon, a gas will first diffuse onto the surface of the carbon and thus be trapped. However, there is a secondary diffusion phenomenon wherein the gas moves further into the adsorbent particle center, or void spaces, in essence, pushed into the void spaces by more gases waiting to be adsorbed to the surface. However, with low concentration gases, this secondary diffusion phenomenon does not take place because there are no high concentration gases there to push the first gases deeper into the adsorbent.

Because of this process, a very large surface area is needed for low concentration gases. Use of granular adsorbents does not provide enough surface area to maintain effective and efficient control of low concentration gases.

As such, what is needed is an improved filtration media, through the application of adsorbent compositions, without the use of binding or adhesive compositions.

SUMMARY OF THE INVENTION

It has surprisingly been discovered that the application, through negative pressure, of small, varied geometry adsorbent to a filtration media successfully entraps the adsorbent within the filtration media. The amount of adsorbent applied can be varied depending on the desired efficiency of particulate matter capture, adsorbent property life, and air restriction requirements. If the main goal of the enhance filtration media is particulate capture only, minimal application of adsorbent compositions provides the benefit of reduced spent filter off-gassing due to oxidation of captured particulate compounds thereby reducing the health risk of handling spent filtration media.

It has also been found that application of certain adsorbent compositions to electret electrostatic filter media has the effect of enhancing the electrostatic charge, thereby allowing more aggressive affixation of adsorbent compositions and increasing the fine particulate capture efficiency of the filtration media with very little sacrifice to air flow restriction.

By completely coating the entire filtration media with the adsorbent, which is highly efficient and very aggressive, the chances of intercepting and adsorbing contaminates is greatly increased. The high quantity of very small adsorbent particles solves the problems associated with thin layers of larger granular adsorbents and the complex geometries also greatly increase the capacity of the adsorbent. This application allows the use of much less adsorbent (by mass) and greatly increases the flexibility of application in a variety of filtration needs.

The present invention relates to the enhancement and improvement of existing filtration media, of which a wide-variety is currently manufactured and available for commercial and private use. Such filtration media is used for the reduction of air-borne pollutants of both particulate and gaseous chemical compound in nature. The present invention enhances and improves existing particulate filtration media by applying an adsorbent without the use of binding or adhesive compositions. Primary benefits of the present invention are two-fold:

First, the present invention increases the particulate capture efficiency of existing particulate filtration media, by pre-loading the media with fine particulate matter in the form of adsorbent compositions. The pre-loading decreases the void spaces of the particulate media, which results in the ability of the media to retain very fine particles at a greater efficiency with minimal sacrifice of pressure drop and filter life. The adsorbent present on the particulate filter prevents filter off-gassing and odors produced by oxidation of trapped contaminates and creates a superior particulate filter with gas-phase capabilities that has an overall thickness of less than ⅛ of an inch. This allows application in 1-inch pleated filter applications.

Second, the present invention incorporates adsorbent compositions to the existing filtration media without the use of binding or adhesive compositions. Through in the incorporation of adsorbent compositions, the media is able to capture and reduce levels of air borne gaseous chemical compounds in the ambient air. By excluding the use of binding or adhesive compositions, the efficiency of the adsorbent compositions is maximized and the degradation and oxidation of binding and adhesive compositions is minimized thereby reducing the production of additional air borne pollutants.

In combination, the primary benefits provide a single filtration media that is superior in both particulate capture and gaseous chemical compound adsorption thereby eliminating the necessity of two inferior filtration media products. Furthermore, the absence of binding or adhesive compositions allows for testing/regeneration of adsorbent compositions without interference of the binding or adhesive compositions.

The present invention provides an air-permeable filtration media that includes an air-permeable backing and an adsorbent. The adsorbent is at least partially embedded in the air-permeable backing, and the adsorbent has an average diameter of about 15 microns or less.

The present invention also provides a method of manufacturing an air-permeable filtration media. The method includes: (a) entraining an adsorbent in a gaseous carrier; (b) contacting an outer surface of an air-permeable backing with the gaseous carrier and entrained adsorbent; (c) maintaining a pressure drop across the thickness of the air-permeable backing from the one face to the other face of the air-permeable backing, sufficient to entrap at least some of the entrained adsorbent on the air-permeable backing, in the air-permeable backing, or on and in the air-permeable backing; and (d) applying a negative pressure to the air-permeable backing, sufficient to remove excess adsorbent from the air-permeable backing and thereby retaining fixed adsorbent on the air-permeable backing, in the air-permeable backing, or on and in the air-permeable backing.

The present invention also provides a method of substantially removing contaminants form air. The method includes passing air through an air-permeable filtration media as described herein, at a rate and for a period of time effective to substantially remove contaminants from the air, thereby reducing exposure to contaminants for those persons or animals present.

BRIEF DESCRIPTION OF THE DRAWINGS

Embodiments of the invention may be best understood by referring to the following description and accompanying drawings which illustrate such embodiments. The numbering scheme for the Figures included herein are such that the leading number for a given reference number in a Figure is associated with the number of the Figure. Reference numbers are the same for those elements that are the same across different Figures. For example, an air permeable filtration media (1) can be located in FIG. 1. However, reference numbers are the same for those elements that are the same across different Figures. In the drawings.

DETAILED DESCRIPTION OF THE INVENTION

Figure 1:
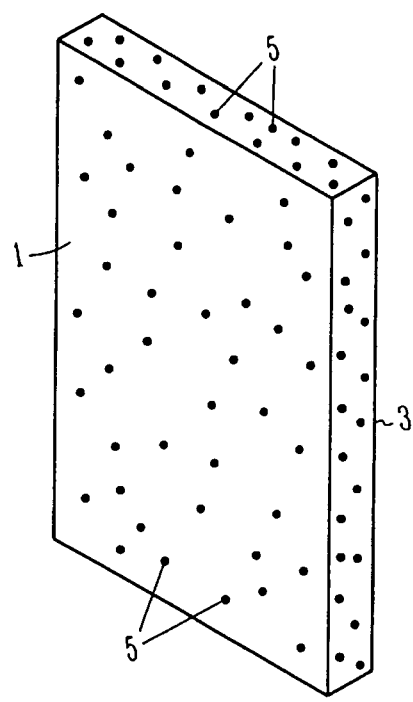
FIG. 1 illustrates an air permeable filtration media of the present invention.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Definitions

As used herein, "air permeable" refers to a substance that can be permeated or penetrated by a gaseous substance (e.g., air); allowing the gaseous substance to pass or diffuse through.

As used herein, "air" refers to a gaseous mixture (typically colorless, odorless, and tasteless), mainly nitrogen (approximately 78 percent) and oxygen (approximately 21 percent) with lesser amounts of argon, carbon dioxide, hydrogen, neon, helium, and other gases; this mixture with varying amounts of moisture and particulate matter, enveloping the earth; the atmosphere. Such air will typically further include one or more contaminants.

As used herein, "filtration media" or "filter" refers to porous material through which a gas is passed in order to separate the gas from suspended particulate matter (contaminants). The filtration media will include a backing and an adsorbent that is at least partially embedded in the backing.

As used herein, an "air-permeable backing" refers to porous material that will further include an adsorbent that is at least partially embedded or impregnated in the backing, forming the filter. For example, an air-permeable backing employed in the present invention can be manufactured from material selected from the group of woven textile fiber webs, unwoven textile fiber webs, woven textile sheet materials, unwoven textile sheet materials, unwoven thermoplastic synthetic polymeric fibers, woven thermoplastic synthetic polymeric fibers, and combinations thereof. Air-permeable backings may be shaped as rectangles, squares, diamonds or circles. The air-permeable backing may criss-cross to form patterns. The air-permeable backing may support a rectangular filter or a cylinder-shaped filter. The air-permeable backing may be pleated or smooth. Examples of air-permeable backing are displayed on products such as the Filtrete Ultra Allergen Reduction Filter manufactured by 3M, the NaturalAire Elite Pleated Furnace Air Filter manufactured by Flanders PrecisionAire and the PM-400 HEPA Filtration System manufactured by MiracleAir.

As used herein, "adsorbent" refers to a substance capable of adsorption of a contaminant; solid substance that adsorbs another substance; a material having capacity or tendency to adsorb another substance. For example, an adsorbent employed in the present invention can consist of activated carbon fiber, activated carbon particles, mixtures of activated carbon fiber and activated carbon particles, carbonized basil planes, carbonized particles, sodium silicate, zeolite particles, molecular sieves, porous polymer adsorbers, carbonized ion-exchangers, or any combination thereof. The adsorbent may have an average diameter of about 50 microns or less. Specifically, the adsorbent can have an average diameter of about 25 microns or less, about 15 microns or less, about 10 microns or less, about 5 microns or less, or about 1 micron or less. Specifically, the adsorbent can consist of carbonized basil planes. More specifically, the adsorbent can consist of carbonized basil planes having the following structure:

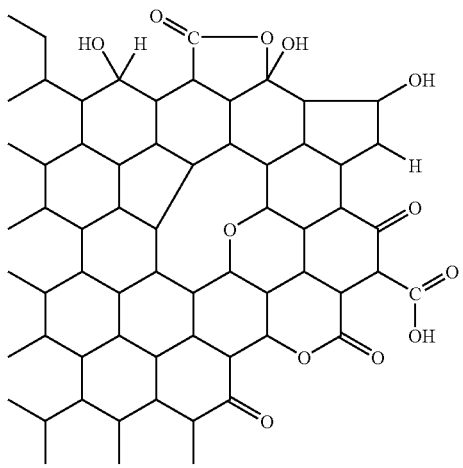

Additionally, the adsorbent can be further substantially coated with at least one substance that assists in adsorbing specific impurities (contaminants). Additionally, the adsorbent can be present in at least about 0.68 grams/meters$^2$ to about 3.5 grams/meters$^2$ of the air-permeable backing. An embodiment of the invention may be a carbon adsorbent purchased from Jacobi Carbon, 1518 Walnut Street, Suite 1100, Philadelphia, Pa. 19102, for example.

As used herein, "embed" or "impregnate" refers to fix firmly in a surrounding mass; to enclose snugly or firmly; to attach to a surrounding mass with a weak electrostatic charge. More specifically, the term refers to the filling, permeation, or saturation of a material (e.g., adsorbent) into a substrate (e.g., air permeable backing).

As used herein, "completely impregnate" refers to about 100% impregnation of a material (e.g., adsorbent) into a substrate (e.g., air permeable backing).

As used herein, "partially embedded" or "partially impregnated refers to a substance that is up to about 5 wt. % embedded, up to about 50 wt. % embedded or up to about 99 wt. % embedded. More specifically, the term refers to an impregnation of a material (e.g., adsorbent) into a substrate (e.g., air permeable backing), of less than about 100%. The impregnation can be up to about $\frac{1}{100}$ of the substrate, up to about $\frac{1}{50}$ of the substrate, up to about $\frac{1}{10}$ of the substrate, up to about $\frac{1}{4}$ of the substrate, up to about $\frac{1}{2}$ of the substrate, up to about $\frac{3}{4}$ of the substrate, or up to about $\frac{99}{100}$ of substrate. More specifically, the impregnation can be about $\frac{1}{20}$ to about $\frac{1}{2}$ of the substrate.

As used herein, "average diameter" refers to the average of the lengths of a straight line segment passing through the center of one or more figures, especially of circles or spheres, and terminating at the periphery. For example, an adsorbent of the present invention can have an average diameter of about 1 micron or less, or about 0.1 microns or less.

As used herein, "granular" refers to a substance composed or appearing to be composed of granules or grains; having a grainy texture.

As used herein, "planar" refers to a substance having a substantially flat two-dimensional surface.

As used herein, "pleated" refers to a fold in cloth made by doubling the material upon itself and then pressing or stitching it into place.

As used herein, "entrain" refers to a pull or draw along after itself; to carry (suspended particles, for example) along in a current.

As used herein, "gaseous carrier" refers to an inert substance used as a vehicle for a substance, that is gaseous in nature.

As used herein, "entrap" refers to a substance that chemically and/or physically contains, suspends, or carries another substance.

As used herein, "fibrous material" refers to a material that has, consisting of, or resembling fibers.

As used herein, "contaminant" refers to an impurity of a substance (e.g., air) not typically found in the substance in a relatively pure state. Contaminants may include organic and inorganic chemicals. Further, contaminants may be in the gaseous form, such as radon. For example, suitable contaminants (impurities) that can effectively be removed from air employing an air permeable filtration media of the present invention include at least one of acetaldehyde, acetic acid, acetic anhydride, acetone, acetylene, acrolein, acrylic acid, acrylonitrile, adhesives, alcoholic beverages, amines, ammonia, amyl acetate, amyl alcohol, amyl ether, animal odors, anesthetics, aniline, antiseptics, asphalt fumes, automobile exhaust, bathroom odors, butyric acid, beer, benzene, bleach, body odors, borane, bromine, burned flesh, burned food, burning fat, butadiene, butane, butanone, butter & fats, butyl acetate, butyl alcohol, butyl cellosolve, butyl chloride, butyl ether, butylene, butyne, butyraidehyde, camphor, cancer odors, caprylic acid, carbolic acid, carbon disulfide, carbon dioxide, carbon monoxide, carbon tetrachloride, cat odors, cellosolve, cellosolve acetate, charred materials, cheese, chlorine, chlorobenzene, chlorobutadiene, chloroform, chloronitropropane, citrus and other fruits, cigarette smoke odor, cleaning compounds, coal smoke odor, combustion odors, cooking odors, corrosive gases, creosote, cresol, cyclohexane, cyclohexanol, cyclohexene, dead animals, decane, decaying matter, deodorants, detergents, dibromoethane, dichlorobenzene, dichloroethane, dichloroethyl ether, dichloronitroethane, dichloropropane, diesel fuels, diethylamine, dioxane, dipropyl ketone, disinfectants, dog odors, embalming odors, ethane, ether, ethyl acetate, ethyl acrylate, ethyl alcohol, ethyl amine, ethyl benzene, ethyl bromide, ethyl ether, ethyl formate, ethylene, ethyl mercaptan, ethyl silicate, ethylene chlorohydrin, ethylene dichloride, ethylene oxide, essential oils, eucalyptole, exhaust fumes, farm odors, fertilizer, film processing odors, fish odors, floral scents, fluorotrichloroethane, food aromas, formaldehyde, formic acid, fuel gasses, fumes, gangrene odor, garbage odors, garlic, gasoline, heptane, heptylene, hexane, hexylene, hexyne, hospital odors, household smells, hydrogen, hydrogen bromide hydrogen chloride, hydrogen cyanide, hydrogen fluoride, hydrogen iodide, hydrogen selenide, hydrogen sulfide, incense, indole, incomplete combustion, industrial wastes, iodine, iodoform, irritants, isophorone, isoprene, isopropyl acetate, isopropyl alcohol, isopropyl ether, kerosene, kitchen odors, lactic acid, lingering odors, liquid fuels, liquor odors, lubricating oils, medicinal odors, melons, menthol, mercaptans, mesityl oxide, methyl acetate, methyl acrylate, methyl alcohol, methyl bromide, methyl butyl ketone, methyl cellosolve, methyl chloride, methyl chloroform, methyl ether, methyl ethyl ketone, methyl isobutyl ketone, methyl mercaptan, methylcyclohexane, methylene chloride, mildew odors, mixed odors, mold, moth balls, naphtha, naphthalene, nicotine, nitric acid, nitrobenzenes, nitroethane, nitrogen dioxide, nitroglycerine, nitromethane, nitropropane, nitrotoluene, nonane, noxious gases, octalene, octane, odorants, onions, organic chemicals, ozone, packing house odors, paint odors, palmitic acid, paper deteriorations, paste and glue, pentane, pentyne, perchloroethylene, perfumes/cosmetics, perspiration, pet odors, phenol, phosgene, pitch, plastics, popcorn/candy, poultry odors, propane, propionic acid, propyl alcohol, propyl chloride, propyl ether, propyl mercaptan, putrefying substances, putrescine, pyridine, radiation products, radon, rancid oils, resins, ripening fruits, rubber, sauerkraut, sewer odors, skatole, slaughtering odors, smog, soaps, smoke, solvents, sour milk, spoiled food, stale odors, stockyards, stoddard solvent, stuffiness, styrene monomer, sulfur dioxide, sulfur trioxide, sulfuric acid, tar, tetrachloroethane, tetrachloroethylene, tobacco smoke odors, toilet odors, toluene, trichlorocthylene, trichloroethane, turpentine, urea, uric acid, valeric acid, and vinegar.

As used herein, "substantially removing contaminants from air" refers to removing a discrete and finite amount of contaminant, such that less contaminants are present in the air relative to the air that did not pass through the air permeable filtration media. For example, substantially removing contaminants from the air may indicate a removal of at least about 30 wt. % of the contaminants present in air. Substantially removing contaminants from air may indicate a removal of at least 75 wt. %, 90 wt. %, 95 wt. % or 99 wt. % of contaminants present in air, for example. Current testing in the industry makes the quantification of contaminant removal difficult, at best. One of the purposes of the present invention may be to substantially remove contaminants from air, such that a person or animal exposed to the filtered air are at a significantly less risk of breathing contaminants than if they were exposed to air that did not pass through the filtration media of the present invention.

As used herein, a "duct system" refers to the network of ducts and vents installed in a residence or commercial building that contain an air supply, usually passing through a heating/cooling system. The duct system may also be setup to periodically or consistently accept outside air, in addition to containing the movement of inside supply air.

As used herein, a "heating/cooling system" refers to a furnace or air conditioning unit that may be placed within a duct system in a residence or commercial building. The heating/cooling system may heat, cool or alternately do both to the air that flows through the duct system. The heating/cooling system may also have a means to force air through the duct system, such as a fan or blower.

As used herein, a "fan or blower" refers to a mechanism for forcing air through a duct system within a residence or commercial building. The fan or blower may be used in conjunction with a heating/cooling system or a filtration unit.

As used herein, a "filtration unit" refers to a stand alone unit or unit used within a duct system that contains filtration media and which filters air within a residence or commercial building. The filtration unit may filter at least some inside air and/or outside air. The filtration unit may stand alone or be placed within a duct system. The unit may also utilize a fan or blower, or solely filter the air that naturally circulates through the unit.

As used herein, "supply air" refers to the air forced through a duct system, usually by a heating/cooling system. Supply air may be filtered by a filtration unit in place in the duct system.

As used herein, "return air" refers to the air that is recirculated through the ducts and vents of a duct system and back to the heating/cooling system and/or filtration unit. The return air may also be mixed with outside air.

Figure 2:
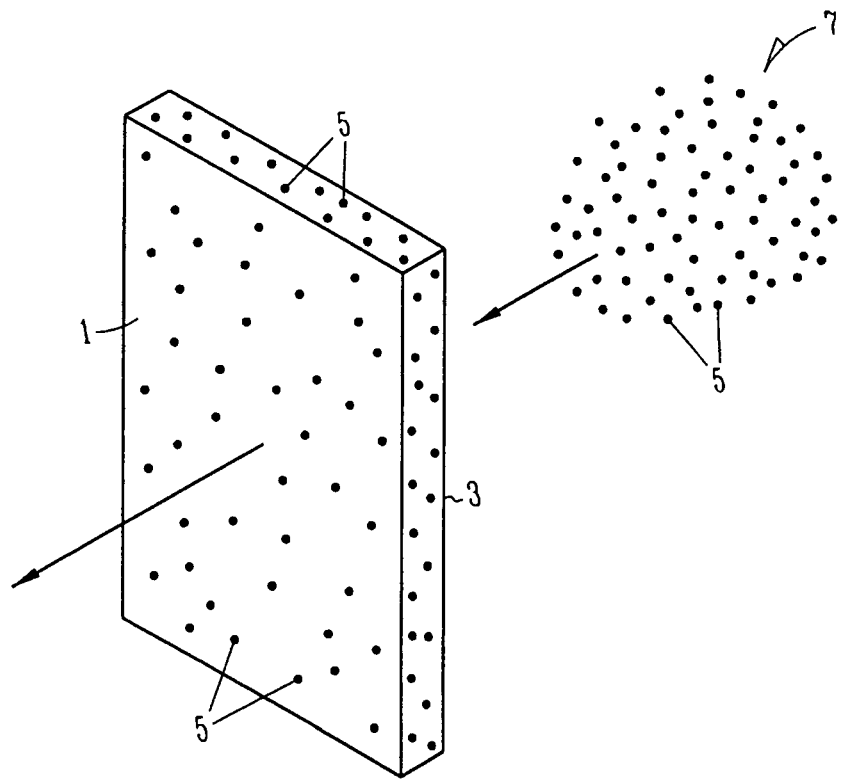
FIG. 2 illustrates an air permeable filtration media prepared by methods of the present invention.

Referring to FIGS. 1-2, an air-permeable filtration media (1) of the present invention is shown. The air-permeable filtration media (1) includes adsorbent (5) located therein. Specifically, the air-permeable filtration media (1) includes adsorbent (5) on the air permeable backing (3), in the air permeable backing (3), or on and in the air permeable backing (3). When the adsorbent (5) is at least partially in the air permeable backing (3), the adsorbent is said to at least partially embed the air permeable backing (3). FIG. 2 also shows the adsorbent (5) entrained in a gaseous carrier (7) and in contact with air permeable backing (3).

Figure 3:
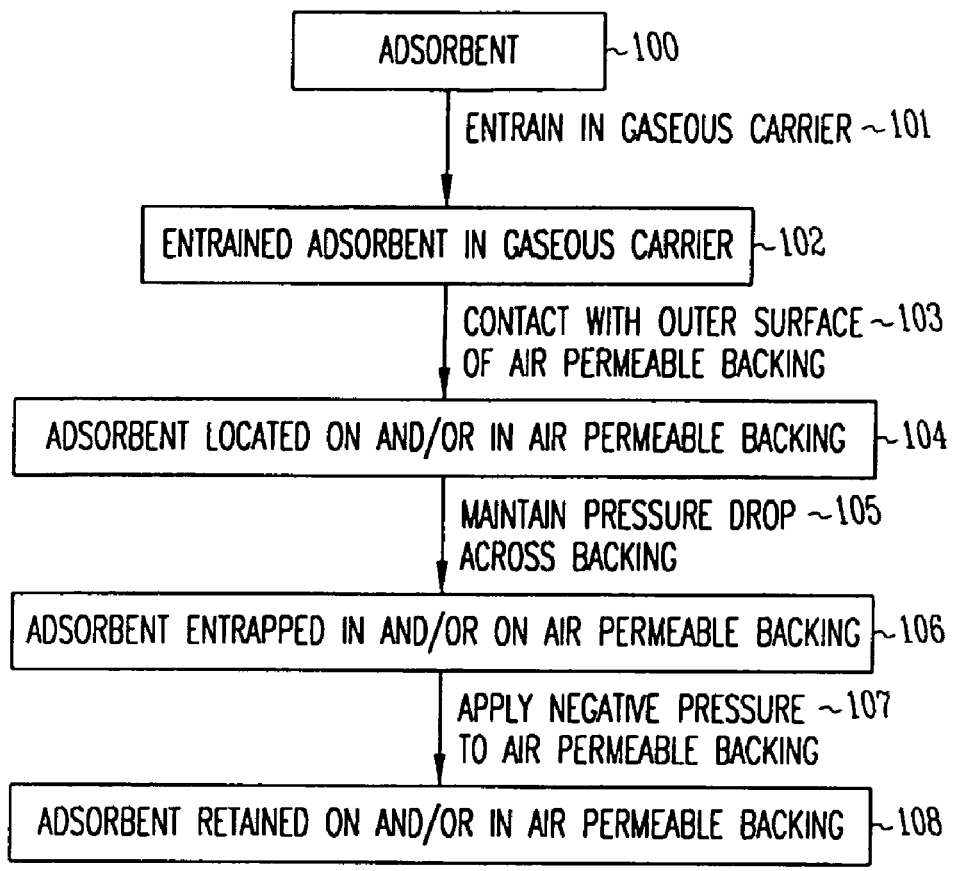
FIG. 3 illustrates a block flow diagram depicting an air permeable filtration media prepared by methods of the present invention.

Referring to FIG. 3, a block flow diagram depicting an air permeable filtration media (1) prepared by methods of the present invention are provided. The method includes entraining an adsorbent (100) in a gaseous carrier (101); contacting an outer surface of an air-permeable backing (103) with the gaseous carrier and entrained adsorbent (102), sufficient to locate at least some adsorbent on and/or in the air permeable backing (104); maintaining a pressure drop across the thickness of the air-permeable backing from the one face to the other face of the air-permeable backing (105), sufficient to entrap at least some of the entrained adsorbent on the air-permeable backing, in the air-permeable backing, or on and in the air-permeable backing (106); and applying a negative pressure to the air-permeable backing (107), sufficient to remove excess adsorbent from the air-permeable backing and thereby retaining fixed adsorbent on the air-permeable backing, in the air-permeable backing, or on and in the air-permeable backing (108). It is appreciated that one skilled in the art will recognize that language indicating that the adsorbent (100) is located "on and/or in" the air permeable backing refers to the partial or complete penetration of the adsorbent in relation to the air permeable backing. The adsorbent may embed at deeper levels of penetration within the air permeable backing as the process described above ensues.

Figure 4:
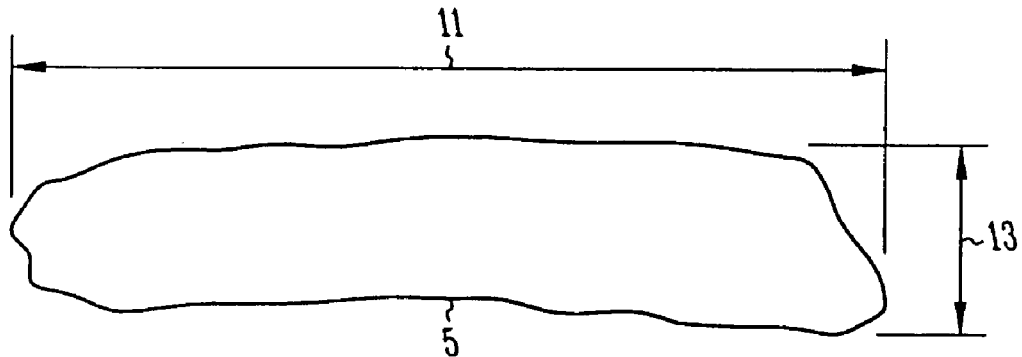
FIG. 4 illustrates a specific adsorbent employed in the present invention.

Referring to FIG. 4, a specific adsorbent (5) employed in the present invention is shown. The adsorbent (5) is substantially planar. Specifically, the ratio of the length (11) to height (13) is greater than about 1. In one specific embodiment of the present invention, the ratio of the length (11) to height (13) is greater than about 3. In another specific embodiment of the present invention, the ratio of the length (11) to height (13) is greater than about 20. Additionally, the surface (e.g., any one or more of the outer surfaces) of the adsorbent (5) can be substantially consistent. For example, the adsorbent (5) can have a surface variation of less than about 10%. Specifically, the adsorbent (5) can have a surface variation of less than about 5%.

Figure 5:
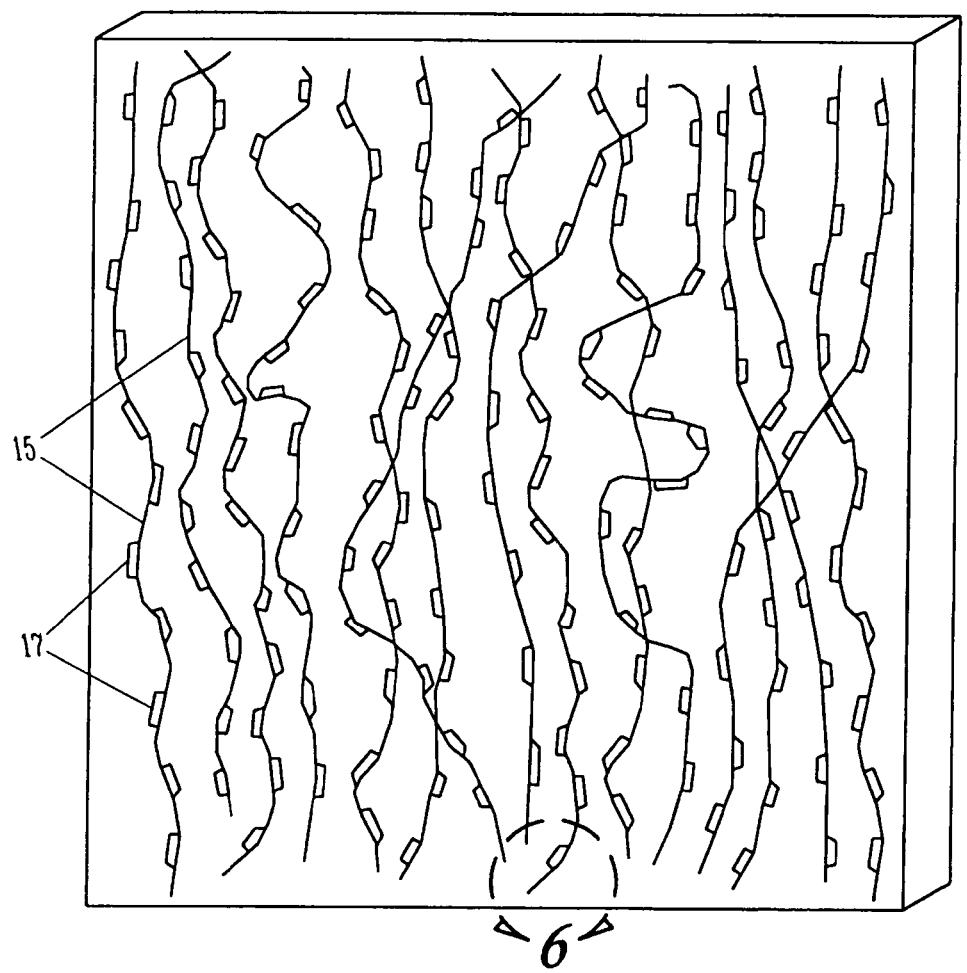
FIG. 5 illustrates the relationship between filter media fibers and carbon adsorbent.
Figure 6:
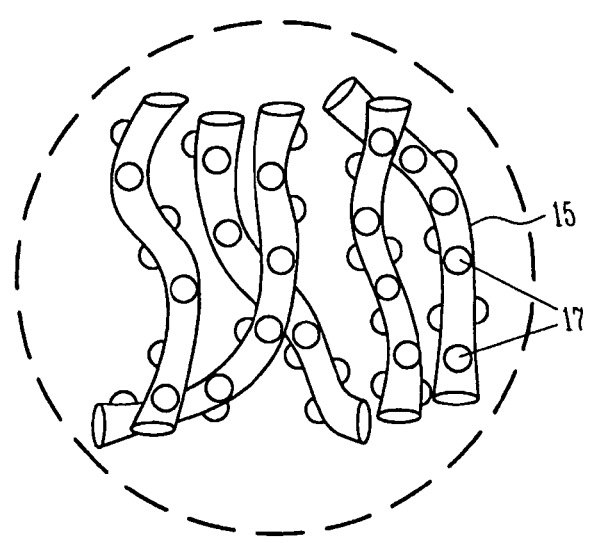
FIG. 6 illustrates a blown up section of FIG. 5.

Referring to FIGS. 5 and 6, fibers (15) in a filter are shown in relation to the carbon adsorbents (17). The fibers (15) are an example of a filter media in which adsorbents may be embedded. The carbon adsorbents (17) are an example of an adsorbent that may embed within the fibers (15). The carbon adsorbents (17) may embed on all sides of the fibers (15), potentially filling the space and voids between fibers (15) or other types of filter media. FIG. 6 is a blown up section of FIG. 5, in which is shown the 3-dimensionality of the carbon adsorbent (17) relationship to the fibers (15). The methods of the present invention provide for the carbon adsorbents (17) to embed in all directions relative to the fibers (15), as shown in FIGS. 5 and 6 and also described in FIG. 3.

Figure 7:
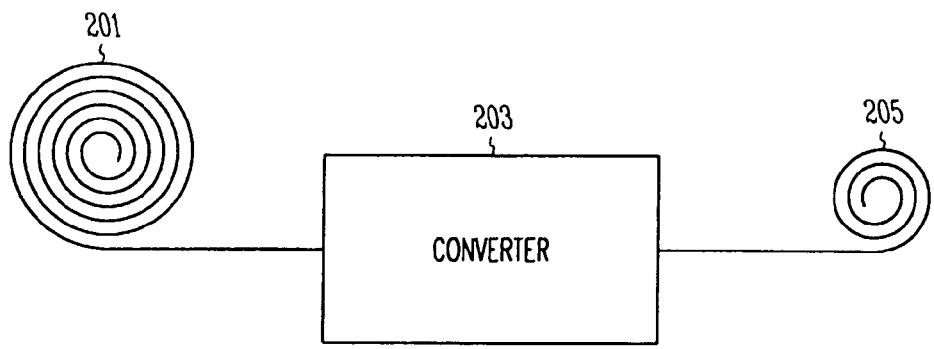
FIG. 7 illustrates the process of treating a roll of filtration media.

Referring to FIG. 7, a process for treating a raw filtration media roll (201) is shown. Bulk filter media generally comes from a supplier wound in rolls of various length and width. The raw media (201) may be unrolled and passed through a converter (203), where the adsorbent may be applied. The treated filter media (205) may be rerolled once adsorbent has been applied in the converter. Once the media has been unrolled, treated and rerolled, it may be cut to size, a wire backing may be applied, pleats may be added and may finally be enclosed in boxes to create a final boxed filter. The speed of the unrolling and rolling of the media must be controlled in order to prevent jamming and inconsistent product due to the changing diameter of the roll. Further, the tension of the rolls must also be monitored to avoid uneven distribution of the adsorbent.

Figure 8:
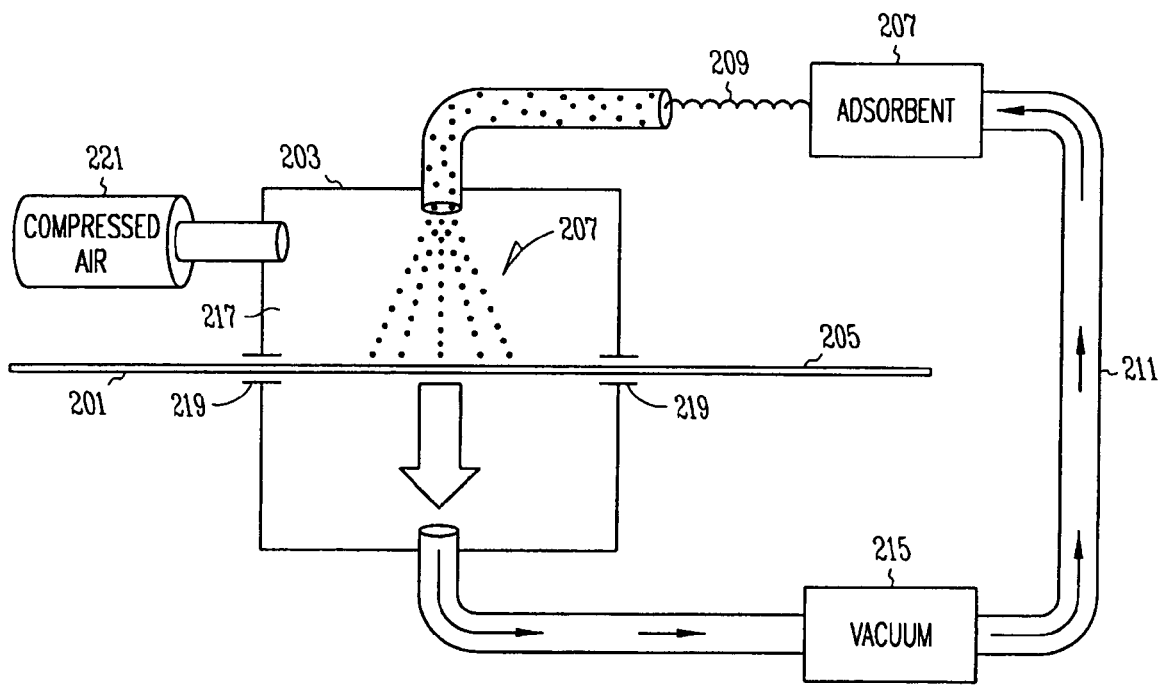
FIG. 8 illustrates a more detailed process of treating filtration media.

Referring to FIG. 8, a more detailed diagram of the process to treat a raw filtration media roll (201) is shown. As the raw media roll (201) is unrolled, it is fed through a slot (219) into the converter (203). The converter (203) encloses the entraining process in which the adsorbent (207) may be pulled via negative pressure (217), such as with a vacuum (215), through the raw filter media (201). Compressed air (221) may be injected every few seconds in order to agitate the adsorbent (207) and prevent clumping of the adsorbent. Small enough injections of compressed air (221) must be used to not interfere with the negative pressure system (217). The adsorbent (207) that is not entrapped in or on the raw media filter (201) may be recirculated (211) through the converter (203). The adsorbent (207) application may be controlled using a metering system (209), such as a simple screw/auger type conveyor system. Variables such as moisture content, air flow, adsorbent metering, media roll speed and tension may be controlled and adjusted for various products.

Figure 9:
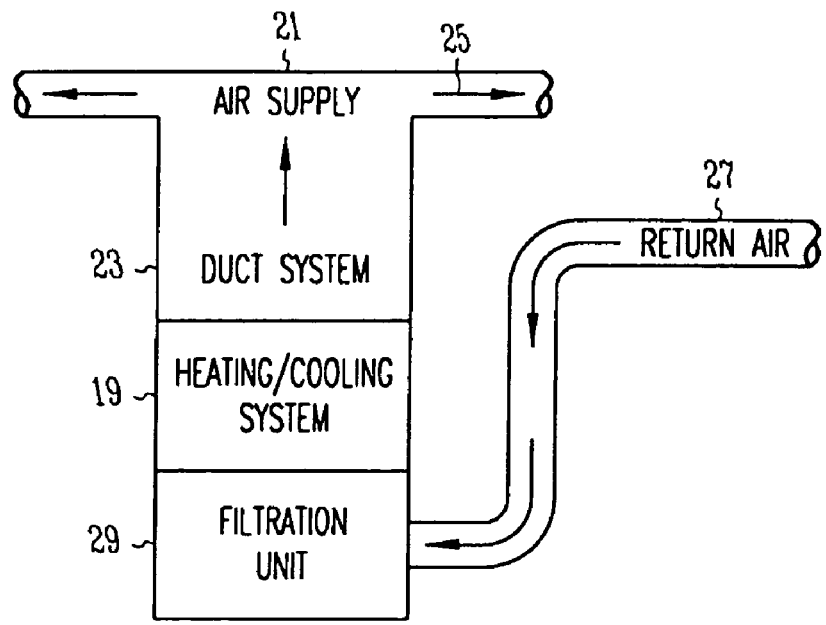
FIG. 9 illustrates a filtration system used in residential or commercial buildings.

Referring to FIG. 9, a filtration system used in residential or commercial buildings is shown. A heating/cooling system (19) forces supply air (21) through a duct system (23). The return air (27) is passed through a filtration unit (29), in which contaminants are removed via the embodiments of the invention. The filtration unit (29) may be adjacent to the heating/cooling system (19) or located at a separate location in the duct system (23). Air flow direction (25) is indicated by the arrows.

Figure 10:
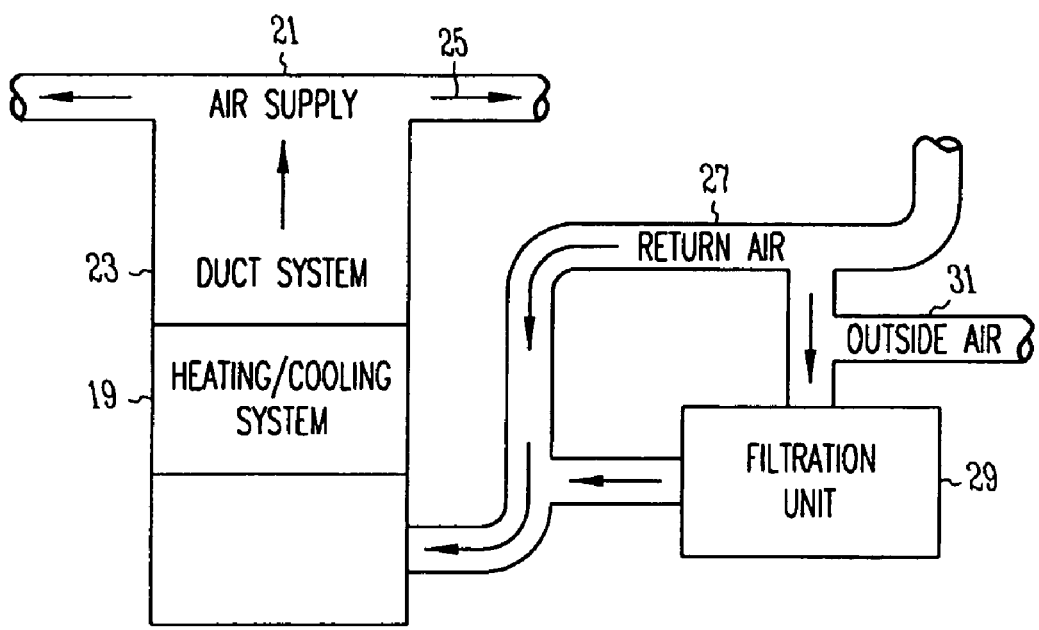
FIG. 10 illustrates a filtration system used in residential or commercial buildings in which outside air is utilized.

Referring to FIG. 10, a filtration system used in residential or commercial buildings in which outside air is utilized. A heating/cooling system (19) forces supply air (21) through a duct system (23). All or at least a portion of the return air (27) is passed through a filtration unit (29), in which contaminants are removed via the embodiments of the invention. The filtration unit (29) may be adjacent to the heating/cooling system (19) or located at a separate location in the duct system (23) as shown in the figure. In addition, outside air (31) may be mixed with return air (27) or separately passed through the filtration unit (29). Air flow direction (25) is indicated by the arrows.

Figure 11:
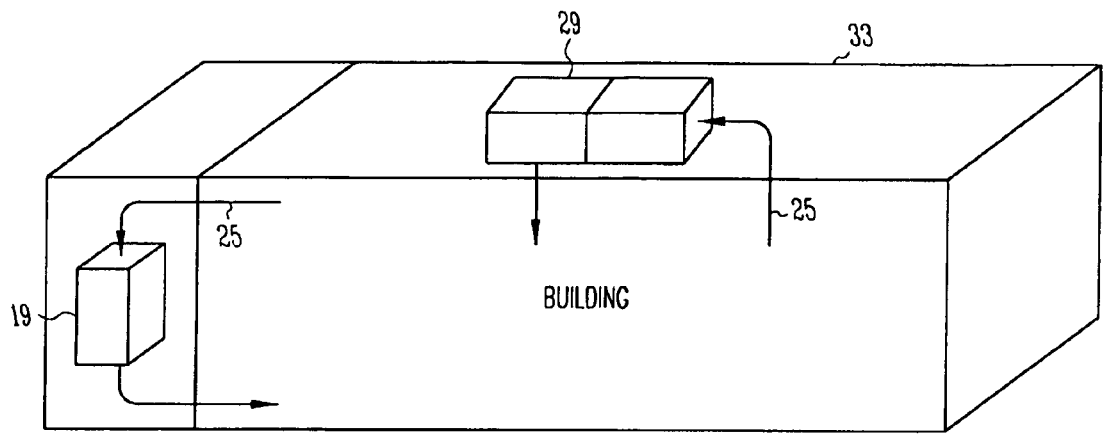
FIG. 11 illustrates a filtration system used in a residential or commercial building in which the filtration unit stands alone.

Referring to FIG. 11, a filtration system used in a residential or commercial building is shown, where the filtration unit (29) stands alone. A filtration unit (29) may stand apart from the heating/cooling system (19) of a building (33). The filtration unit (29) removes contaminants via the embodiments of the present invention. The filtration unit (29) may utilize a fan or blower to circulate air or simply rely on the air movement generated by the heating/cooling system (19) or general air movement created within the building (33). Air flow direction (25) is indicated by the arrows.

Figure 12:
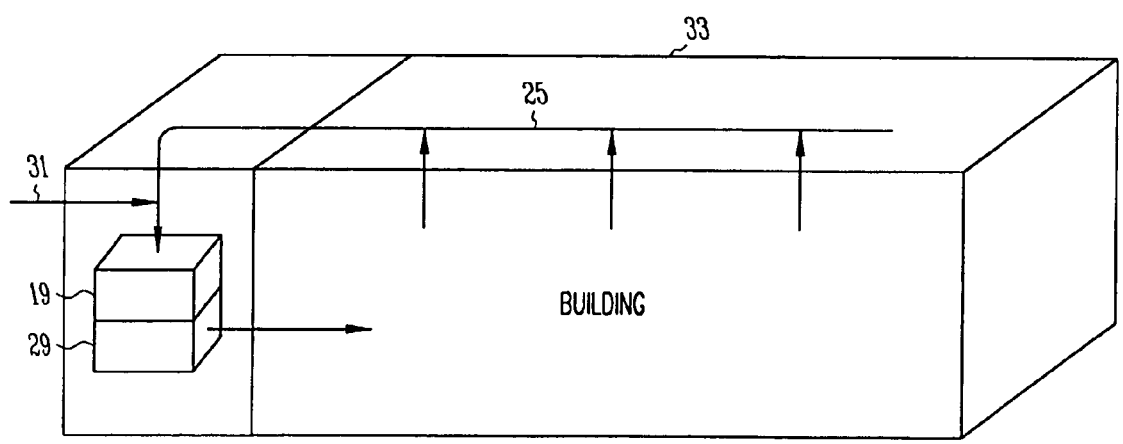
FIG. 12 illustrates a filtration system used in a residential or commercial building in which outside air and multiple pickup points are utilized.

Referring to FIG. 12, a filtration system used in a residential or commercial building is shown, in which outside air and multiple pickup points are utilized. A filtration unit (29) is shown in conjunction with a building's (33) heating/cooling system (19). The filtration unit (29) removes contaminants based on the embodiments of the present invention. The heating/cooling system (19) or filtration unit (29), either separately or in combination, may utilized a duct system that has multiple pickup points for return air flow. In addition, the filtration system, may pass outside air (31) through the filtration unit (29) or heating/cooling system (19). Air flow direction (25) is indicated by the arrows.

The invention claimed is:

1. A method of substantially removing contaminants from air, the method comprising:
    passing a stream of air though an air-permeable filtration media comprising an air-permeable backing and at least one adsorbent at least partially applied to the air-permeable backing without the use of a binding or adhesive composition, including passing the stream of air through an enhanced electrostatic charge formed from the at least partial application of the at least one adsorbent onto the air-permeable backing; and
    removing one or more contaminants from the stream of air using, at least in part, the enhanced electrostatic charge.

2. The method of claim 1, wherein passing the stream of air through the air-permeable backing and the at least one adsorbent at least partially applied to the air-permeable backing without the use of the binding or adhesive composition includes minimizing one or both of degradation or oxidation of the binding or adhesive composition or the removed one or more contaminants.

3. The method of claim 1, wherein passing the stream of air through the air-permeable backing and the at least one adsorbent at least partially applied to the air-permeable backing without the use of the binding or adhesive composition includes increasing a life span of the air-permeable filtration media.

4. The method of claim 1, wherein the enhanced electrostatic charge formed from the at least partial application of the at least one adsorbent onto the air-permeable backing provides an increased affixation of the at least one adsorbent to the air-permeable backing.

5. The method of claim 1, wherein removing the one or more contaminants using the enhanced electrostatic charge includes increasing contaminant capture efficiency with little to no restriction to the passage of the stream of air through the air-permeable filtration media.

6. The method of claim 1, wherein passing the stream of air though the at least one adsorbent includes passing the stream of air through a plurality of adsorbents having an average diameter of about 10 microns or less.

7. The method of claim 1, wherein passing the stream of air through the at least one adsorbent includes passing the stream of air through a plurality of adsorbents having an average diameter of about 5 microns or less.

8. The method of claim 1, wherein passing the stream of air through the at least one adsorbent includes passing the stream of air through a plurality of adsorbents having an average diameter of about 1 micron or less.

9. A method of substantially removing contaminants from air, the method comprising:
    passing a stream of air though an air-permeable filtration media comprising an air-permeable backing and at least one adsorbent applied to, and at least partially embedded within, the air-permeable backing without the use of a binding or adhesive composition, including passing the stream of air through an enhanced electrostatic charge formed from the at least partial embedding or application of the at least one adsorbent into the air-permeable backing, the at least one adsorbent having an average diameter of about 50 microns or less; and removing one or more contaminants from the stream of air, including passing the stream of air at a rate and for a period effective to substantially remove the one or more contaminants.

10. The method of claim 9, wherein removing the one or more contaminants comprises removing at least one of acetaldehyde, acetic acid, acetic anhydride, acetone, acetylene, acrolein, acrylic acid, acrylonitrile, adhesives, alcoholic beverages, amines, ammonia, amyl acetate, amyl alcohol, amyl ether, animal odors, anesthetics, aniline, antiseptics, asphalt fumes, automobile exhaust, bathroom odors, butyric acid, beer, benzene, bleach, body odors, borane, bromine, burned flesh, burned food, burning fat, butadiene, butane, butanone, butter & fats, butyl acetate, butyl alcohol, butyl cellosolve, butyl chloride, butyl ether, butylene, butyne, butyraidehyde, camphor, cancer odors, caprylic acid, carbolic acid, carbon disulfide, carbon dioxide, carbon monoxide, carbon tetrachloride, cat odors, cellosolve, cellosolve acetate, charred materials, cheese, chlorine, chlorobenzene, chlorobutadiene, chloroform, chloronitropropane, citrus and other fruits, cigarette smoke odor, cleaning compounds, coal smoke odor, combustion odors, cooking odors, corrosive gases, creosote, cresol, cyclohexane, cyclohexanol, cyclohexene, dead animals, decane, decaying matter, deodorants, detergents, dibromoethane, dichlorobenzene, dichloroethane, dichloroethyl ether, dichloronitroethane, dichloropropane, diesel fuels, diethylamine, dioxane, dipropyl ketone, disinfectants, dog odors, embalming odors, ethane, ether, ethyl acetate, ethyl acrylate, ethyl alcohol, ethyl amine, ethyl benzene, ethyl bromide, ethyl ether, ethyl formate, ethylene, ethyl mercaptan, ethyl silicate, ethylene chlorohydrin, ethylene dichloride, ethylene oxide, essential oils, eucalyptole, exhaust fumes, farm odors, fertilizer, film processing odors, fish odors, floral scents, fluorotrichloroethane, food aromas, formaldehyde, formic acid, fuel gasses, fumes, gangrene odor, garbage odors, garlic, gasoline, heptane, heptylene, hexane, hexylene, hexyne, hospital odors, household smells, hydrogen, hydrogen bromide hydrogen chloride, hydrogen cyanide, hydrogen fluoride, hydrogen iodide, hydrogen selenide, hydrogen sulfide, incense, indole, incomplete combustion, industrial wastes, iodine, iodoform, irritants, isophorone, isoprene, isopropyl acetate, isopropyl alcohol, isopropyl ether, kerosene, kitchen odors, lactic acid, lingering odors, liquid fuels, liquor odors, lubricating oils, medicinal odors, melons, menthol, mercaptans, mesityl oxide, methyl acetate, methyl acrylate, methyl alcohol, methyl bromide, methyl butyl ketone, methyl cellosolve, methyl chloride, methyl chloroform, methyl ether, methyl ethyl ketone, methyl isobutyl ketone, methyl mercaptan, methylcyclohexane, methylene chloride, mildew odors, mixed odors, mold, moth balls, naphtha, naphthalene, nicotine, nitric acid, nitrobenzenes, nitroethane, nitrogen dioxide, nitroglycerine, nitromethane, nitropropane, nitrotoluene, nonane, noxious gases, octalene, octane, odorants, onions, organic chemicals, ozone, packing house odors, paint odors, palmitic acid, paper deteriorations, paste and glue, pentane, pentyne, perchloroethylene, perfumes/cosmetics, perspiration, pet odors, phenol, phosgene, pitch, plastics, popcorn/candy, poultry odors, propane, propionic acid, propyl alcohol, propyl chloride, propyl ether, propyl mercaptan, putrefying substances, putrescine, pyridine, radiation products, radon, rancid oils, resins, ripening fruits, rubber, sauerkraut, sewer odors, skatole, slaughtering odors, smog, soaps, smoke, solvents, sour milk, spoiled food, stale odors, stockyards, stoddard solvent, stuffiness, styrene monomer, sulfur dioxide, sulfur trioxide, sulfuric acid, tar, tetrachloroethane, tetrachloroethylene, tobacco smoke odors, toilet odors, toluene, trichloroethylene, trichloroethane, turpentine, urea, uric acid, valeric acid, and vinegar and volatile organic compounds (VOC's).

11. The method of claim 9, wherein removing the one or more contaminants includes removing up to about 90 wt. % of the contaminants from the stream of air.

12. The method of claim 9, wherein removing the one or more contaminants includes removing up to about 75 wt. % of the contaminants from the stream of air.

13. The method of claim 9, wherein removing the one or more contaminants includes removing at least about 30 wt. % of the contaminants from the stream of air.

14. The method of claim 9, wherein removing the one or more contaminants includes removing one or both of at least one particulate or at least one gaseous chemical compound from the stream of air.

15. The method of claim 14, wherein removing the at least one particulate from the stream of air includes capturing the at least one particulate.

16. The method of claim 14, wherein removing the at least one gaseous chemical compound from the stream of air includes adsorbing the at least one gaseous chemical compound.

17. The method of claim 9, wherein passing the stream of air through the at least one adsorbent includes passing the stream of air though a plurality of varied geometry adsorbents.

18. The method of claim 9, wherein passing the stream of air through the air-permeable backing and the at least one adsorbent includes passing the stream of air though at least one adsorbent forced into the air-permeable backing via a maintained pressure drop across a thickness of the air-permeable backing.

19. The method of claim 9, wherein passing the stream of air through the air-permeable backing and the at least one adsorbent includes eliminating the production of air borne pollutants resulting from the degradation and oxidation of the binding or adhesive composition or the removed one or more contaminants.

20. The method of claim 9, wherein passing the stream of air through the at least one adsorbent includes passing the stream of air through a plurality of adsorbents having an average diameter of about 15 microns or less.

* * * * *